US008184116B2

(12) United States Patent
Finn et al.

(10) Patent No.: US 8,184,116 B2
(45) Date of Patent: May 22, 2012

(54) OBJECT BASED AVATAR TRACKING

(75) Inventors: Peter George Finn, Brampton (CA);
Rick Allen Hamilton, II, Charlottesville, VA (US); Brian Marshall O'Connell, Cary, NC (US); Clifford Alan Pickover, Yorktown Heights, NY (US); Keith Raymond Walker, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1019 days.

(21) Appl. No.: 12/108,925

(22) Filed: Apr. 24, 2008

(65) Prior Publication Data
US 2009/0267948 A1 Oct. 29, 2009

(51) Int. Cl.
*G06T 15/00* (2011.01)
(52) U.S. Cl. ............... 345/419; 463/31; 463/32
(58) Field of Classification Search ............... 345/419; 463/31–33
See application file for complete search history.

(56) References Cited

U.S. PATENT DOCUMENTS

| | | | |
|---|---|---|---|
| 6,023,270 A | 2/2000 | Brush, II et al. | |
| 6,036,601 A | 3/2000 | Heckel | |
| 6,394,301 B1 | 5/2002 | Koch | |
| 6,421,047 B1 | 7/2002 | de Groot | |
| 6,532,007 B1 | 3/2003 | Matsuda | |
| 6,749,510 B2 | 6/2004 | Giobbi | |
| 6,788,946 B2 | 9/2004 | Winchell et al. | |
| 6,798,407 B1 | 9/2004 | Benman | |
| 6,868,389 B1 | 3/2005 | Wilkins et al. | |
| 6,895,406 B2 | 5/2005 | Fables et al. | |
| 6,954,728 B1 | 10/2005 | Kusumoto et al. | |
| 6,981,220 B2 | 12/2005 | Matsuda | |
| 7,025,675 B2 | 4/2006 | Fogel et al. | |
| 7,158,135 B2 | 1/2007 | Santodomingo et al. | |
| 7,305,691 B2 | 12/2007 | Cristofalo | |
| 7,320,031 B2 | 1/2008 | Konig et al. | |
| 7,454,065 B2 | 11/2008 | Satoh | |
| 7,479,967 B2 | 1/2009 | Bachelder et al. | |
| 7,685,204 B2 | 3/2010 | Rogers | |
| 7,720,835 B2 | 5/2010 | Ward et al. | |
| 7,805,680 B2 | 9/2010 | Meyers et al. | |
| 7,822,687 B2 | 10/2010 | Brillon et al. | |
| 8,001,161 B2 | 8/2011 | Finn et al. | |

(Continued)

OTHER PUBLICATIONS

U.S. Appl. No. 12/108,968, filed Apr. 24, 2008, Finn et al.

(Continued)

*Primary Examiner* — Xiao M. Wu
*Assistant Examiner* — Scott E Sonners
(74) *Attorney, Agent, or Firm* — Yee & Associates, P.C.; Mark C. Vallone

(57) ABSTRACT

A computer implemented method, apparatus, and computer program product for object based avatar tracking. In one embodiment, a range for an object in a virtual universe is identified. The range comprises a viewable field of the object. Avatars in the viewable field of the object are capable of viewing the object. Avatars outside the viewable field of the object are incapable of viewing the object. In response to an avatar coming within the range of the object, an object avatar rendering table is queried for a session associated with the avatar unique identifier and the object unique identifier. The object avatar rendering table comprises a unique identifier of a set of selected objects and unique identifiers for each avatar in a range of a selected object in the set of selected objects. An object initiation process associated with the object is triggered.

18 Claims, 6 Drawing Sheets

U.S. PATENT DOCUMENTS

| | | | |
|---|---|---|---|
| 2002/0024532 | A1 | 2/2002 | Fables et al. |
| 2002/0056091 | A1 | 5/2002 | Bala et al. |
| 2002/0107072 | A1 | 8/2002 | Giobbi |
| 2002/0113809 | A1 | 8/2002 | Akazawa et al. |
| 2002/0169644 | A1 | 11/2002 | Greene |
| 2003/0004774 | A1 | 1/2003 | Greene et al. |
| 2004/0034561 | A1 | 2/2004 | Smith |
| 2004/0053690 | A1 | 3/2004 | Fogel et al. |
| 2004/0166935 | A1 | 8/2004 | Gavin et al. |
| 2004/0210634 | A1 | 10/2004 | Ferrer et al. |
| 2004/0220850 | A1 | 11/2004 | Ferrer et al. |
| 2005/0071306 | A1 | 3/2005 | Kruszewski et al. |
| 2005/0086112 | A1 | 4/2005 | Shkedi |
| 2005/0086605 | A1 | 4/2005 | Ferrer et al. |
| 2005/0114198 | A1 | 5/2005 | Koningstein et al. |
| 2005/0156928 | A1* | 7/2005 | Santodomingo et al. ..... 345/428 |
| 2005/0179685 | A1 | 8/2005 | Kake et al. |
| 2005/0253872 | A1* | 11/2005 | Goss et al. ................ 345/660 |
| 2005/0286769 | A1 | 12/2005 | Satoh |
| 2006/0168143 | A1 | 7/2006 | Moetteli |
| 2006/0194632 | A1 | 8/2006 | Hendrickson et al. |
| 2006/0195462 | A1 | 8/2006 | Rogers |
| 2006/0258462 | A1 | 11/2006 | Cheng et al. |
| 2007/0035561 | A1 | 2/2007 | Bachelder et al. |
| 2007/0043616 | A1* | 2/2007 | Kutaragi et al. ............. 705/14 |
| 2007/0191104 | A1 | 8/2007 | Van Luchene |
| 2007/0247979 | A1 | 10/2007 | Brillon et al. |
| 2007/0252841 | A1* | 11/2007 | Kim ........................ 345/522 |
| 2007/0261109 | A1 | 11/2007 | Renaud et al. |
| 2008/0004119 | A1 | 1/2008 | Van Luchene et al. |
| 2008/0252716 | A1 | 10/2008 | Kano et al. |
| 2008/0281622 | A1 | 11/2008 | Hoal |
| 2009/0063168 | A1 | 3/2009 | Finn et al. |
| 2009/0089157 | A1 | 4/2009 | Narayanan |
| 2009/0227368 | A1* | 9/2009 | Wyatt ........................ 463/31 |
| 2009/0254417 | A1 | 10/2009 | Beilby et al. |
| 2009/0267937 | A1 | 10/2009 | Finn et al. |
| 2009/0267950 | A1 | 10/2009 | Finn et al. |
| 2009/0267960 | A1 | 10/2009 | Finn et al. |
| 2009/0271422 | A1 | 10/2009 | Finn et al. |
| 2009/0299960 | A1 | 12/2009 | Lineberger et al. |
| 2009/0327219 | A1 | 12/2009 | Finn et al. |
| 2010/0001993 | A1 | 1/2010 | Finn et al. |
| 2010/0005423 | A1 | 1/2010 | Finn et al. |
| 2010/0177117 | A1 | 7/2010 | Finn et al. |
| 2010/0205179 | A1 | 8/2010 | Carson et al. |

OTHER PUBLICATIONS

U.S. Appl. No. 12/108,987, filed Apr. 24, 2008, Finn et al.
U.S. Appl. No. 12/109,010, filed Apr. 24, 2008, Finn et al.
U.S. Appl. No. 12/165,922, filed Jul. 1, 2008, Finn et al.
U.S. Appl. No. 12/109,023, filed Apr. 24, 2008, Finn et al.
U.S. Appl. No. 12/109,040, filed Apr. 24, 2008, Finn et al.
U.S. Appl. No. 12/168,657, filed Jul. 7, 2008, Finn et al.
U.S. Appl. No. 11/846,724, filed Aug. 29, 2007, Finn et al.
USPTO office action for U.S. Appl. No. 12/168,657, dated Apr. 26, 2011.
USPTO notice of allowance for U.S. Appl. No. 12/109,023, dated Apr. 13, 2011.
USPTO office action for U.S. Appl. No. 12/109,023 dated Dec. 1, 2010.
USPTO Office Action for U.S. Appl. No. 12/109,040 dated Feb. 3, 2011.
PTO Office Action for U.S. Appl. No. 12/109,040, dated Jul. 15, 2011.
Kiss et al., "Viewpoint Adaptation During Navigation Based on Stimuli from the Virtual Environment" Web3D 03' Proceedings of the Eighth International Conference on 3D Web Technology, ACM, New York, NY, 2003, p. 23.
Avatar-Based Marketing: The Avatar-Based Panel (Part One of Five), New World Notes, http://nwn.blogs.com/nwn/2006/06/avatarbased_mar.html, accessed Nov. 10, 2011, 15 pages.
Avatar-Based Marketing: The Avatar-Based Panel (Part Two of Five) New World Notes, http://nwn.blogs.com/nwn/2006/06/avatarbased_mar.html, accessed Nov. 10, 2011, 6 pages.
Avatar-Based Marketing: The Avatar-Based Panel (Part Three of Five) New World Notes, http://nwn.blogs.com/nwn/2006/06/avatarbased_mar.html, accessed Nov. 10, 2011, 6 pages.
Avatar-Based Marketing: The Avatar-Based Panel (Part Four of Five), New World Notes, http://nwn.blogs.com/nwn/2006/06/avatarbased_mar.html, accessed Nov. 10, 2011, 6 pages.
Avatar-Based Marketing: the Avatar-Based Panel (Part One of Five) New World Notes, http://nwn.blogs.com/nwn/2006/06/avatarbased_mar.html, accessed Nov. 10, 2011, 6 pages.
Hughes, "Those custom Reeboks and the next party," Eightbar, http://eightbar.co.uk/2006/10/11/those-custom-reeboks-and-the-next-party, accessed Oct. 11, 2006, 5 pages.
Hughes, "Planes, trains and automobiles, here come Nissan," Eightbar, http://eightbar.co.uk/2006/10/24/planes-trains-and-automobiles-here-come-nissan, Oct. 24, 2006, 3 pages.
Hughes, "The Sony BMG media island, it is very good," Eightbar, http://eightbar.co.uk/2006/10/19/the-sony-bmg-media-island-it-is-very-good, Oct. 19, 2006, 8 pages.
Hughes, "Ben Folds in Second Life the Event," Eightbar, http://eightbar.co.uk/2006/10/20/ben-folds-in-second-life-the-event, Oct. 20, 2006, 3 pages.
Reynolds, "Virtual Worlds introduction presentation," Eightbar, http://eightbar.co.uk/2006/08/17/virtual-worlds-introduction-presentation, Aug. 17, 2006, 8 pages.
"Life2Life—ECS-Powered Amazon Store Within Second Life," Amazon Web Services Blog, http://aws.typepad.com/aws/2006/07/lifetolife_ecspo.html, accessed Nov. 10, 2011, 7 pages.
"Trap," NWN Wikia, http://web archive.org/web/20071112084836/http://nwn.wikia.com/wiki/Trap, accessed Sep. 14, 2011, 3 pages.
"Unseen," WOW Wiki, http://web.archive.org/web/20070207113119/http://www.wowwiki.com/Unseen, accessed Sep. 14, 2011, 2 pages.
USPTO Office Action regarding U.S. Appl. No. 11/846,724, dated Oct. 27, 2010.
USPTO Final Office Action regarding U.S. Appl. No. 11/846,724, dated Feb. 4, 2011.
USPTO Office Action regarding U.S. Appl. No. 12/108,968, dated Oct. 28, 2011.
USPTO Supplemental Notice of Allowance regarding U.S. Appl. No. 12/109,023, dated May 13, 2011.
USPTO Office Action regarding U.S. Appl. No. 12/165,922, dated Nov. 10, 2011.
USPTO Final Office Action regarding U.S. Appl. No. 12/168,657, dated Oct. 4, 2011.
USPTO Office Action regarding U.S. Appl. No. 12/353,656, dated Aug. 24, 2011.
Gladestrider, "ZAM Everquest Classes: The Ranger—Tracking-Help," http://everquest.allakhazam.com/db/classes.html?=10&mid=1098807428716491276, dated Oct. 26, 2004, 2 pages.
Riddikulus, "Dungeons and Dragons Online Eberron Unlimited Forums: Repeating quests-limit?" http://forums.ddo.com/showthread.php?t=123676, dated Oct. 8, 2007, 6 pages.
USPTO Office Action regarding U.S. Appl. No. 12/108,987, dated Dec. 1, 2011, 39 pages.
USPTO Office Action regarding U.S. Appl. No. 12/109,010, dated Jan. 30, 2012, 43 pages.
USPTO Final Office Action regarding U.S. Appl. No. 12/353,656, dated Dec. 23, 2011, 47 pages.

* cited by examiner

| OBJECT BASED AVATAR TABLE 800 | |
|---|---|
| RENDERING UUID = PRIMARY KEY | |
| OBJECT A UUID | AVATAR A UUID |
| | AVATAR A ZONE 1 ENTER TIME |
| | AVATAR A ZONE 2 ENTER TIME |
| | AVATAR A ZONE 1 LEAVE TIME |
| | AVATAR A ZONE 2 LEAVE TIME |
| OBJECT B UUID | AVATAR A UUID |
| | AVATAR A ZONE 1 ENTER TIME |
| | AVATAR A ZONE 2 ENTER TIME |
| | AVATAR A ZONE 1 LEAVE TIME |
| | AVATAR A ZONE 2 LEAVE TIME |
| | AVATAR C UUID |
| | AVATAR C ZONE 1 ENTER TIME |
| | AVATAR C ZONE 2 ENTER TIME |
| | AVATAR C ZONE 1 LEAVE TIME |
| | AVATAR C ZONE 2 LEAVE TIME |

*FIG. 8*

OBJECT BASED AVATAR TRACKING

BACKGROUND OF THE INVENTION

1. Field of the Invention

The present invention is related generally to a data processing system and in particular to a method and apparatus for managing objects in a virtual universe. More particularly, the present invention is directed to a computer implemented method, apparatus, and computer usable program code for object based avatar tracking to dynamically determine viewable areas associated with an avatar within the vicinity of an object.

2. Description of the Related Art

A virtual universe (VU), also referred to as a metaverse or "3D Internet", is a computer-based simulated environment. Examples of virtual universes include Second Life®, Entropia Universe, The Sims Online®, There, and Red Light Center. Other examples of virtual universes include multiplayer online games, such as EverQuest®, Ultima Online®, Lineage®, and World of Warcraft® (WoW).

Many virtual universes are represented using three dimensional (3-D) graphics and landscapes. The properties and elements of the virtual universe often resemble the properties of the real world, such as in terms of physics, houses, and landscapes. Virtual universes may be populated by thousands of users simultaneously. In a virtual universe, users are sometimes referred to as "residents."

The users in a virtual universe can interact, inhabit, and traverse the virtual universe through the use of avatars. An avatar is a graphical representation of a user that other users in the virtual universe can see and interact with. The avatar's appearance is typically selected by the user and often takes the form of a cartoon-like representation of a human. However, avatars may also have non-human appearances, such as animals, elves, trolls, orcs, fairies, and other fantasy creatures.

A viewable field is the field of view for a particular user. The viewable field for a particular user may include objects, as well as avatars belonging to other users. An object is an element in a virtual universe that does not represent a user. An object may be, for example, buildings, statues, billboards, signs, and advertisements in the virtual universe. The viewable field of a particular user is determined by the virtual universe grid software according to the geometries and textures that are currently loaded in a user's virtual universe client. The virtual universe grid determines the length of time that a user views an object based on processing the data sent to each virtual universe client.

Objects are prevalent in virtual universes. Sometimes one or more objects in a particular user's viewable field may be obstructed from view by other objects in the virtual environment such that the user is unable to see the one or more obstructed objects. For example, a sign may be hidden from view behind a statue or other larger sign. In addition, objects may prove difficult for some users to view based on their relative position and other characteristics, such as lighting and color.

SUMMARY OF THE INVENTION

According to one embodiment of the present invention, a computer implemented method, apparatus, and computer usable program code for object based avatar tracking is provided. A range for an object in a virtual universe is identified. The range comprises a viewable field of the object. Avatars within the viewable field of the object are capable of viewing the object. Avatars outside the viewable field of the object are incapable of viewing the object. In response to an avatar coming within the range of the object, an object avatar rendering table is queried for a session associated with the avatar unique identifier and the object unique identifier. The object avatar rendering table comprises a set of unique identifiers for a set of selected objects and a unique identifier for each avatar within a range of a selected object in the set of selected objects. An object initiation process associated with the object is triggered.

BRIEF DESCRIPTION OF THE DRAWINGS

FIG. 8 is a block diagram of an object based avatar table for a plurality of objects in accordance with an illustrative embodiment.

DETAILED DESCRIPTION OF THE PREFERRED EMBODIMENT

Figure 1:
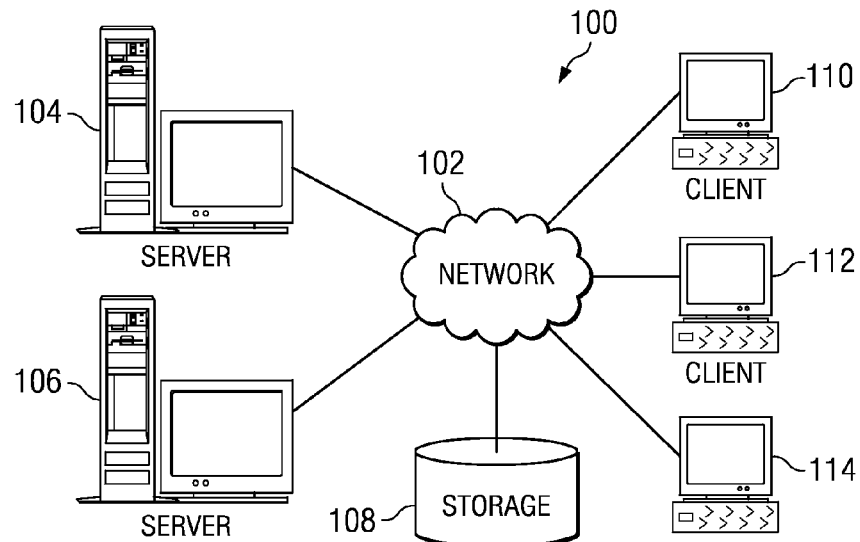
FIG. 1 is a pictorial representation of a network of data processing systems in which illustrative embodiments may be implemented.
Figure 2:
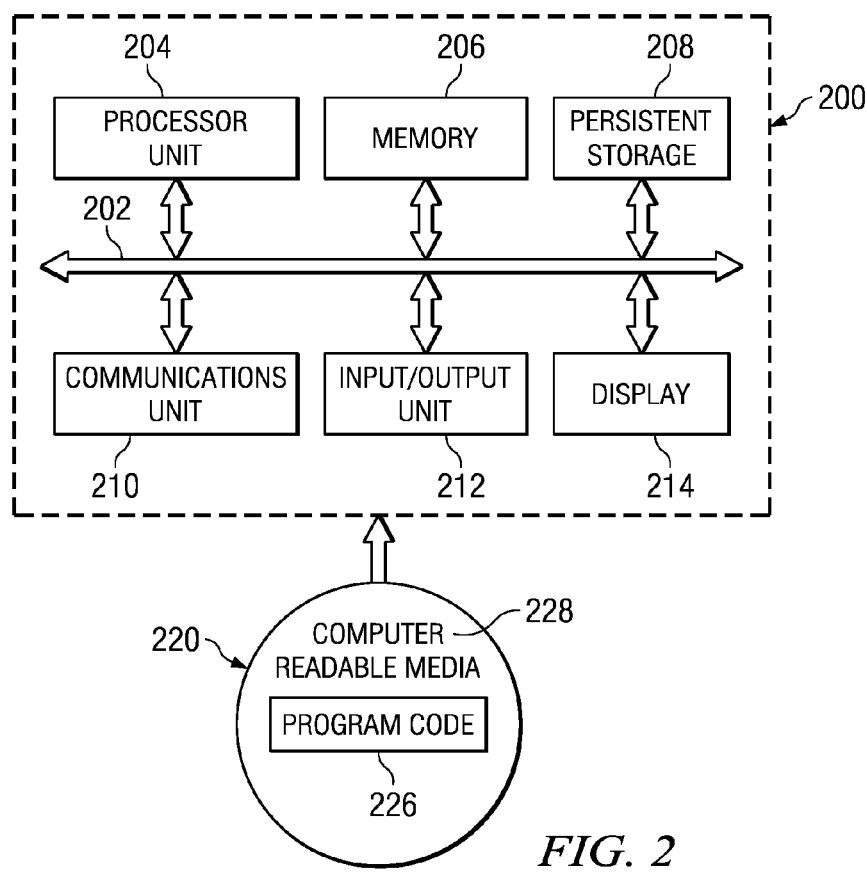
FIG. 2 is a diagram of a data processing system is depicted in accordance with an illustrative embodiment of the present invention.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. Servers 104 and 106 are servers associated with a virtual universe. Users of the virtual universe have agents on servers 104 and 106. An agent is a user's account. A user uses an agent to build an avatar representing the user. The agent is tied to the inventory of assets or possessions the user owns in the virtual universe. In addition, a region in a virtual universe typically resides on a single server, such as, without limitation, server 104. A region is a virtual area of land within the virtual universe.

Clients 110, 112, and 114 connect network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example.

In a virtual universe, assets, avatars, the environment, and anything visual consists of unique identifiers (UUIDs) tied to geometric data, textures, and effects data. Geometric data is distributed to a user's client computer as textual coordinates. Textures are distributed to a user's client computer as graphics files, such as Joint Photographic Experts Group (JPEG) files. Effects data is typically rendered by the user's client according to the user's preferences and the user's client device capabilities.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments. Network data processing system 100 may include additional servers, clients, and other devices not shown.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

A virtual universe is a computer-simulated environment, such as, without limitation, Second Life®, Entropia Universe, The Sims Online®, There, Red Light Center, EverQuest®, Ultima Online®, Lineage®, and World of Warcraft®. A virtual universe is typically represented using three dimensional (3-D) graphics and landscapes.

The users in the virtual universe interact, inhabit, and traverse the virtual universe through avatars. Avatars represent users and are controlled or associated with users. A user can view objects and other avatars within a given proximity of the user's avatar. The virtual universe grid software determines which objects and other avatars are within the given proximity of the user's avatar according to the geometries and textures that are currently loaded in the user's virtual universe client. The virtual universe grid determines the length of time that a user views an object or other avatar in proximity of the user based on processing the data sent to each virtual universe client. However, current virtual universe systems do not enable tracking of objects and avatars within a range of one or more selected objects.

Therefore, the illustrative embodiments provide a computer implemented method, apparatus, and computer program product for object based avatar tracking. In one embodiment, a range for an object in a virtual universe is identified. The range comprises a viewable field of the object. Avatars in the viewable field of the object are capable of viewing the object. Avatars outside the viewable field of the object are incapable of viewing the object. In response to an avatar coming within the range of the object, an object avatar rendering table is queried for a session associated with the avatar unique identifier and the object unique identifier. The object avatar rendering table comprises a unique identifier of a set of selected objects and unique identifiers for each avatar in a range of a selected object in the set of selected objects. An object initiation process associated with the object is triggered.

Figure 3:
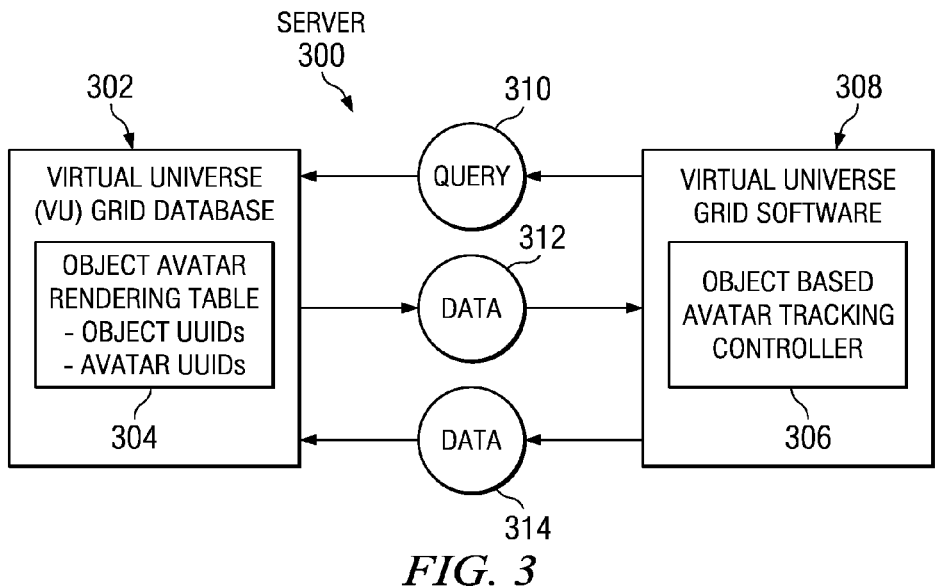
FIG. 3 is a block diagram illustrating a virtual universe grid server in accordance with an illustrative embodiment.

FIG. 3 is a block diagram illustrating a virtual universe grid server in accordance with an illustrative embodiment. Server 300 is a server associated with a virtual universe. Server 300 may be a single, stand-alone server, or server 300 may be a server in a virtual universe grid computing system or in a cluster of two or more servers. In this example, server 300 is a server in a grid computing system for rendering and managing a virtual universe.

Virtual universe grid database 302 is a database on the grid computing system for storing data used by virtual universe grid software 308 to render and manage the virtual universe. Virtual universe grid database 302 includes object avatar rendering (OAR) table 304. Object avatar rendering table 304 stores object unique identifiers and avatar unique identifiers.

In a virtual universe, assets, avatars, the environment, and anything visual consists of unique identifiers (UUIDs) tied to geometric data, textures, and effects data. Geometric data is data associated with the form or shape of avatars and objects in the virtual universe. Geometric data may be used to construct a wire frame type model of an avatar or object. Geometric data is distributed to a user's client computer as textual coordinates. Textures are distributed to a user's client computer as graphics files, such as JPEG files. Texture data refers to the surface detail and surface textures or color that is applied to wire-frame type geometric data to render the object or avatar. Effects data is typically rendered by the user's client according to the user's preferences and the user's client device capabilities.

Object avatar rendering table 304 stores a unique identifier (UUID) for each selected object in the virtual universe. A selected object is an object in a plurality of objects in the virtual universe that is tracked, monitored, managed, or associated with object avatar rendering table 304. Object avatar rendering table 304 also stores unique identifiers and other data describing avatars within a viewable field of a selected object or within a selected zone or range associated with the selected object. For example, if the selected objects include object A and object B, then object avatar rendering table 304 stores object A unique identifier, unique identifiers and other data for all avatars within the viewable field of object A, object B unique identifier, and unique identifiers and other data describing all avatars within the viewable field of object B.

Object based avatar tracking controller 306 stores data 314 in object avatar rendering table 304. Data 314 includes the unique identifiers and other data describing avatars within the viewable field of one or more selected objects. When object based avatar tracking controller 306 needs data from object avatar rendering table for implementing geometric and texture modifications in the virtual universe, object based avatar tracking controller 306 sends query 310 to object avatar rendering table 304. In response to query 310, virtual universe grid database 302 sends data 312 to virtual universe grid software 308 for utilization by object based avatar tracking controller 306 to track avatars and implement modifications of the selected objects to improve the position and appearance of the selected objects within the virtual universe and enable improved visibility of the selected objects.

Virtual universe grid software 308 is software for rendering the virtual universe. Virtual universe grid software 308 includes object based avatar tracking controller 306. Object based avatar tracking controller 306 is software for tracking avatars within the viewable field of each selected object.

Figure 4:
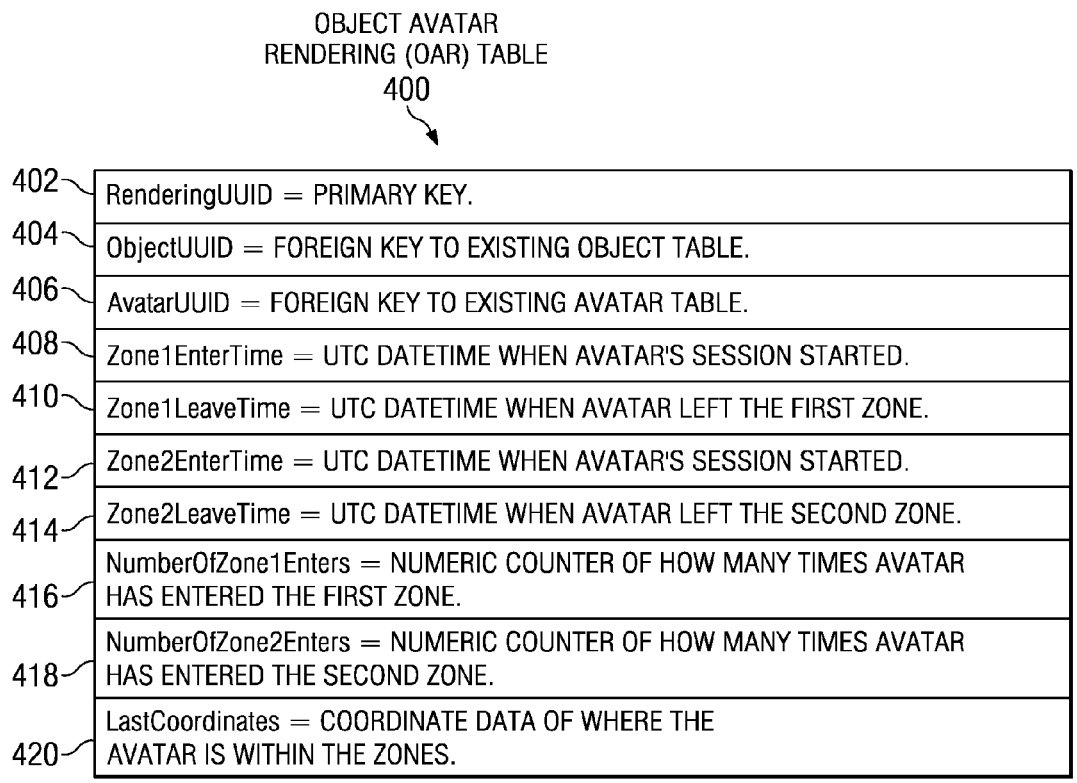
FIG. 4 is a block diagram of an object avatar rendering table in accordance with an illustrative embodiment.

FIG. 4 is a block diagram of an object avatar rendering table in accordance with an illustrative embodiment. Object avatar rendering table 400 is an example of data in an object avatar rendering table, such as object avatar rendering table 304 in FIG. 3.

RenderingUUID 402 is a primary key for object avatar rendering table 400. ObjectUUID 404 is a unique identifier for a selected object in a virtual universe. Object UUID 404 is a foreign key to the existing object table. AvatarUUID 406 is a foreign key to an existing avatar table. AvatarUUID 406 includes a unique identifier for each avatar in the viewable field of the object associated with objectUUID 404.

Zone1EnterTime 408 is a field of a date and/or time when an avatar enters a first zone within the viewable field of an object. In this example, the zone 1 enter time is a time when an avatar entered the first zone, assuming a model with two or more zones. Zone1LeaveTime 410 is a field for a date and/or time when the avatar leaves the first zone. Zone2EnterTime 412 is a field in object avatar rendering table 400 for storing a date and/or time when an avatar enters a second zone. The second zone may be an area that is outside the viewable field. In other words, the second zone is an area in which an avatar cannot see the selected object, but the area is in close proximity to the viewable field in which the avatar will be able to see the object. Thus, when an avatar enters the second zone, the object avatar tracking controller software may begin preparing to display the object to the avatar when the avatar does eventually enter the viewable field.

Zone2LeaveTime 414 is a field for storing the date and/or time when a given avatar leaves the second zone. NumberofZone1Enters 416 is a field for storing the number of times a particular avatar has entered the first zone. This information may be useful to determine whether the user has never viewed the object and therefore content associated with an object should be displayed in full to the user associated with the avatar. The information in NumberofZone1Enters 416 is also used to determine whether the user has viewed the object one or more times in the past, and therefore, the content associated with the object should be displayed in part, skip introductory material, be modified or abbreviated, or otherwise altered so that the exact same content is not displayed to the user every time the user is within the viewable field of the object.

NumberofZone2Enters 418 is a field for storing the number of times an avatar has entered the second zone. LastCoordinates 420 is a field for storing the coordinate data describing where a given avatar is within the first zone or the second zone of a selected object. The coordinate data is typically given in xyz type coordinate data.

Figure 5:
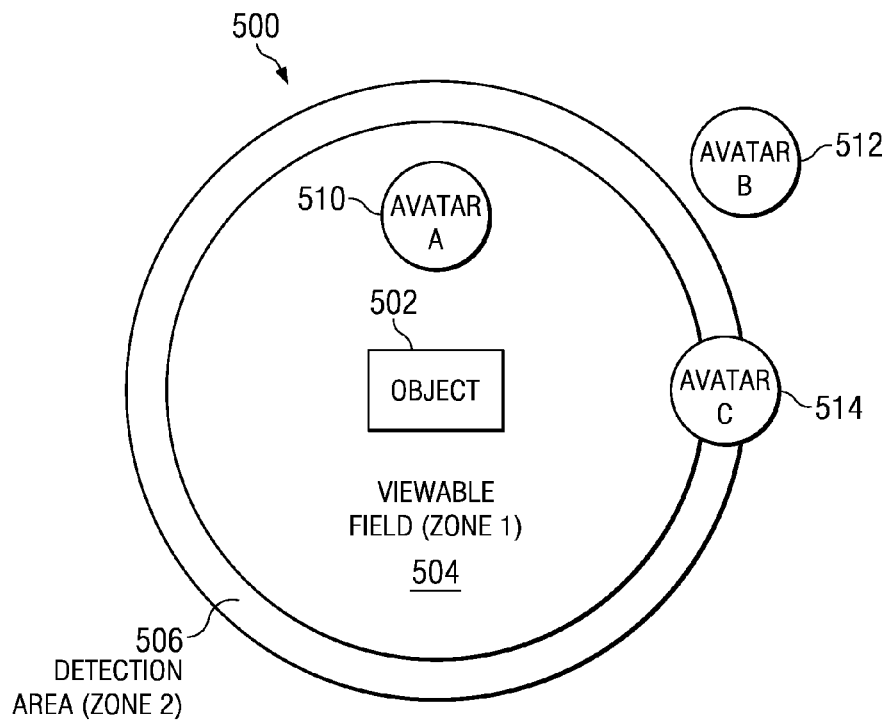
FIG. 5 is a block diagram of a viewable area for an object in accordance with an illustrative embodiment.

FIG. 5 is a block diagram of a viewable area for an object in accordance with an illustrative embodiment. Range 500 is a viewable field 504 and detection area 506 associated with object 502 in a virtual universe. An object, such as object 502, is an element in a virtual universe that is not directly controlled by a user or associated with a user's account. An object may be, for example, buildings, statues, billboards, signs, and advertisements in the virtual universe. In this example, object 502 is an advertisement, such as a billboard or a sign.

Viewable field 504 has a focal point or center at a location that is the same as the location of object 502. Viewable field 504 may also be referred to as zone 1 or a first zone. An avatar in viewable field 504 is able to see or view object 502 and/or content associated with object 502. For example, object 502 may be associated with video and/or audio content. Object 502 may also optionally have some movement associated with the object. For example, object 502 may be capable of some limited movement or animation. However, in this example, object 502 is substantially limited to a single location in the virtual universe.

Object 502 is rendered on a user's screen when an avatar associated with the user is within viewable field 504. Object 502 is rendered using any perspective mode, including but not limited to, a first person perspective, a third person perspective, a bird's eye view perspective, or a map view perspective. A map view perspective renders objects with labels rather than with extensive details and/or texturing.

Detection area 506 is an area adjacent to viewable field 504 within range 500. Detection area 506 may also be referred to as a second zone or zone 2. An avatar in detection area 506 cannot see object 502 or view content associated with object 502. However, when an avatar enters detection area 506, the object avatar tracking controller software can begin preparing to display object 502 and content associated with object 502 to the avatar when the avatar enters viewable field 504.

In this example, avatar A 510 is within viewable field 504. Therefore, avatar A 510 is able to view or see object 502. Avatar C 514 is within detection area 506. Avatar C 514 is not able to see or view object 502. However, the presence of avatar C 514 indicates that avatar C 514 may be about to enter viewable field 504 or that avatar C 514 has just left viewable field 504. Avatar B 512 is outside range 500. Avatar B 512 is not able to see or view object 502. In addition, avatar B 512 is not close enough to viewable field 504 to indicate that avatar B 512 may be preparing to enter viewable field 504. Therefore, an object avatar tracking table for object 502 includes entries for avatar A 510 in zone 1 and avatar C 514 in zone 2. However, in this example, the record associated with object 502 in the object avatar rendering table does not include an avatar unique identifier or data for avatar B 512 because avatar B 512 is outside both viewable field 504 and detection area 506.

Objects are prevalent in virtual universes. The illustrative embodiments recognize that objects in a particular user's viewable field may be obstructed from view by one or more other objects such that a user cannot see the object because of the obstruction. In such cases, the focal point of the viewable area for an object may be set at a location other than the location of the object.

Figure 6:
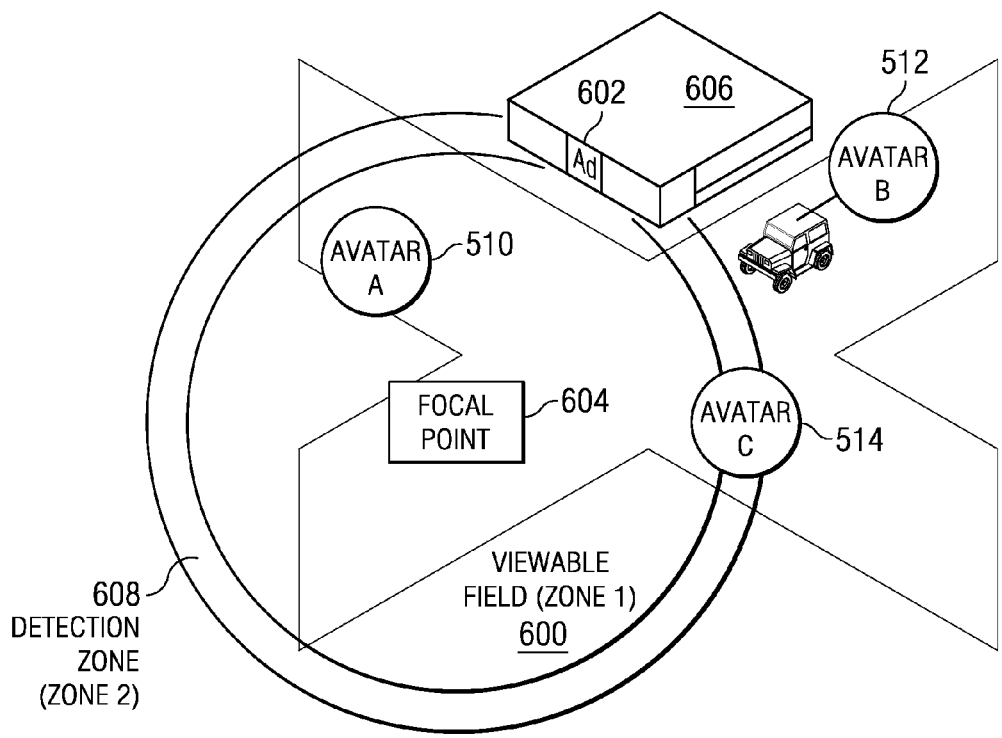
FIG. 6 is a block diagram of a viewable area for an object having a focal point at a location other than the location of the object in accordance with an illustrative embodiment.

FIG. 6 is a block diagram of a viewable area for an object having a focal point at a location other than the location of the object in accordance with an illustrative embodiment. Viewable field 600 is a viewable field for object 602. In this example, object 602 is an advertisement in front of object 606. Viewable field 600 is a range in which an avatar, such as avatars 510-514, may view object 606. An avatar can see object 602 if the avatar is within viewable field 600.

Viewable field 600 has focal point 604. Focal point 604 is a point from which the range or area of viewable field 600 for object 602 is determined. In other words, viewable field 600 is an area that is identified based on a predetermined radius or distance from focal point 604. Here, focal point 604 is a location that is different from the location of object 602 because object 602 is adjacent to an obstructing object. In this example, the obstructing object is object 606.

In this example, when avatar C 514 comes in range of detection area 608 of object 602, object based avatar tracking controller, such as object based avatar tracking controller 306 in FIG. 3, makes a determination as to whether there is an existing session associated with the unique identifier of object 602 and the unique identifier of avatar C 514. This step may be implemented by making a query to the object avatar rendering table to determine if avatar C 514 has ever entered zone 2 or zone 1 previously. If there is not an existing session for avatar C 514, the object based avatar tracking controller creates a record in the object avatar rendering table with the unique identifier of object 602 and the unique identifier of avatar C 514.

The record in the object avatar rendering table may optionally include additional information, such as, without limitation, a date and time when avatar C 514 entered zone 2, a date and time when avatar C 514 leaves zone 2, a date and time when avatar C 514 enters zone 1, a number of zone 2 enters, a number of zone 1 enters, coordinates of avatar C 514, and any other data describing avatar C 514. This data is used by the virtual universe grid software for analysis, reporting, and billing purposes.

Object 602 may have an initiation process associated with object 602. For example, if object 602 is an advertisement with an audio and video content associated with viewing object 602, an initiation process may include buffering the audio and/or video content, checking a cache for the audio and/or video content, caching the audio and/or video content, or any other initiation process.

When avatar C 514 enters detection area 608, the object-based avatar tracking controller triggers any object initiation process defined by object 602. When avatar C 514 enters viewable field (zone 1) 600, the object based avatar tracking controller displays the buffered or cached content. If a user is viewing the object for the first time and object 602 has a video or audio file associated with viewing the object, the process starts playing the video or audio from the beginning.

If a session already exists, the object based avatar tracking controller triggers any object re-initiation process defined by object 602. For example, if the user is not viewing an object with an associated video for the first time, the process starts playing the video at a point in the video after the beginning, such as after an introduction, in a middle part, or near the end of the video to avoid replaying introductory material.

The object based avatar tracking controller makes a determination as to whether the position of avatar C 514 has changed. Changing position may include traveling, turning, walking, or disappearing, such as teleporting, logging off, or disconnecting. When avatar C's 514 position changes, the object based avatar tracking controller adds the user position data to the object avatar rendering table, such as at a field for LastCoordinates 420 in FIG. 4. The user position data includes angle of view coordinate data of the avatar relative to object 602 and the distance of avatar C 514 to object 602.

The object based avatar tracking controller performs an analysis of the position data and modifies object 602 according to one or more geometric and texture modification methods (GTMs) to improve visibility of the object.

When avatar C 514 is out of range of viewable field 600 and detection area 606, the object based avatar tracking controller logs a session pause for the session associated with avatar C 514. The log may include the date and time of the session pause. When the session has been paused for an amount of time that exceeds a threshold amount of time, the object based avatar tracking controller terminates the session associated with avatar C 514. The process termination may include, without limitation, removing the records and data associated with avatar C 514 from the object avatar rendering table. If the record is not deleted, when avatar C 514 comes back into range of zone 1 or zone 2 of object 602, the object based avatar tracking controller determine that an existing session associated with the unique identifier of object 602 and a unique identifier of avatar C 514 already exist. In such a case, a new record for avatar C 514 will not be created. Instead, the data in the object based avatar rendering table will be updated with new data regarding avatar C 514 in the range of object 602.

Figure 7:
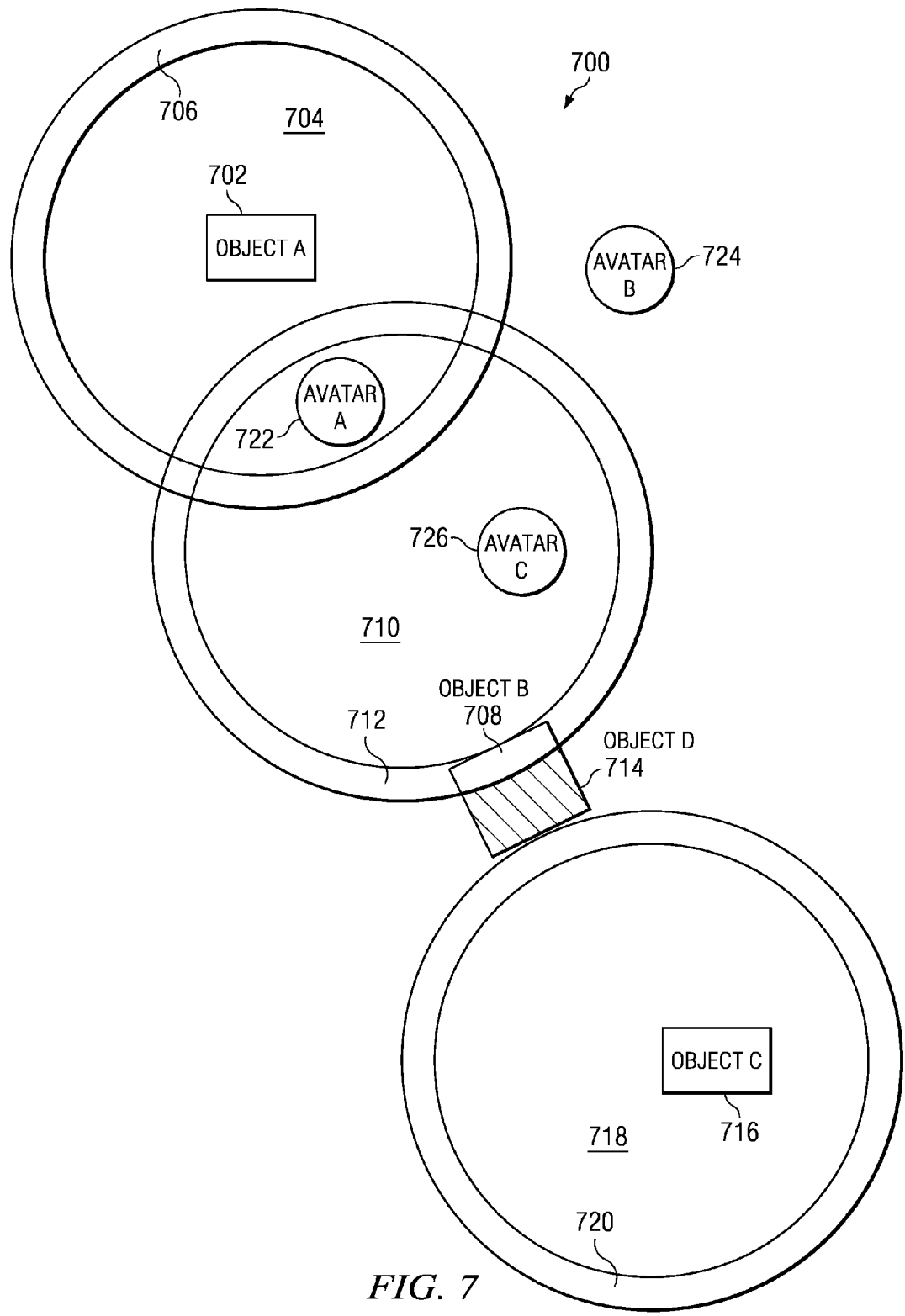
FIG. 7 is a block diagram of viewable areas for a plurality of objects in accordance with an illustrative embodiment.

FIG. 7 is a block diagram of viewable areas for a plurality of objects in accordance with an illustrative embodiment. Region 700 is a region in a virtual universe. Region 700 is associated with a server, such as server 104 in FIG. 1. Each region in a virtual universe is typically supported by a different server.

Object A 702 is associated with viewable field (zone 1) 704. Object A 702 may also optionally have a detection area (zone 2) 706. Viewable field (zone 1) 710 is a viewable area associated with object B 708. Object B 708 may also have detection area (zone 2) 712. In this example, viewable field 710 overlaps in part with a portion of viewable field 704. Object B 708 has a focal point of viewable field 710 that is at a location other than a location of object B 708 because object B 708 is partially obstructed by object D 714. Object C 716 is associated with viewable field 718. Object C 716 is optionally associated with detection area (zone 2) 720.

In this example, avatar A 722 is within viewable field 704 of object A 702 and viewable field 710 of object B 708. In other words, avatar A 722 can see object A 702 or object B 708. Avatar C 726 is within viewable field 710 of object B 708. Avatar C 726 is able to see or view object B 708. Avatar B 724 is outside the viewable fields of objects 702, 708, 714, and 716.

FIG. 8 is a block diagram of an object based avatar table for a plurality of objects in accordance with an illustrative embodiment. Object based avatar table 800 is an object based avatar table for a plurality of selected objects. In this example, object based avatar table 800 includes a unique identifier for selected object A 802 and object B 820. Data describing avatars for each selected object is also included.

For example, object based avatar table 800 includes avatar A UUID 804, avatar A zone 1 enter time 806, avatar A zone 2 enter time 808, avatar A zone 1 leave time 810, and avatar A zone 2 leave time 812. Object based avatar table 800 includes data regarding avatars associated with zone 1 and zone 2 of object B 820. For example, and without limitation, object based avatar table 800 includes avatar A UUID 822, avatar A zone 1 enter time 824, avatar A zone 2 enter time 826, avatar A zone 1 leave time 828, avatar A zone 2 leave time 830, avatar C UUID 832, avatar C zone 1 enter time 834, avatar C zone 2 enter time 836, avatar C zone 1 leave time 838, and avatar C zone 2 leave time 840.

The fields and data shown in object based avatar table 800 are only examples of fields and data that may be included in an object based avatar table. However, implementations of object based avatar tables are not limited to only including the data and/or fields shown in FIG. 8. An object based avatar table may include additional data and/or additional fields not shown in FIG. 8.

In addition, object based avatar table 800 in this example only includes data and fields for two objects and two different avatars. However, an object based avatar table may include fields and/or data for any number of objects and any number of avatars. In other words, object based avatar table 800 may include fields and/or data for a single object, as well as two or more objects. Likewise, object based avatar table 800 may include fields and/or data for tracking a single avatar associated with each object, as well as two or more avatars associated with each object's viewable field and/or detection area. In addition, an object based avatar table may be implemented with fields in more than one table, such as with foreign keys related to primary keys in a relational database.

Figure 9:
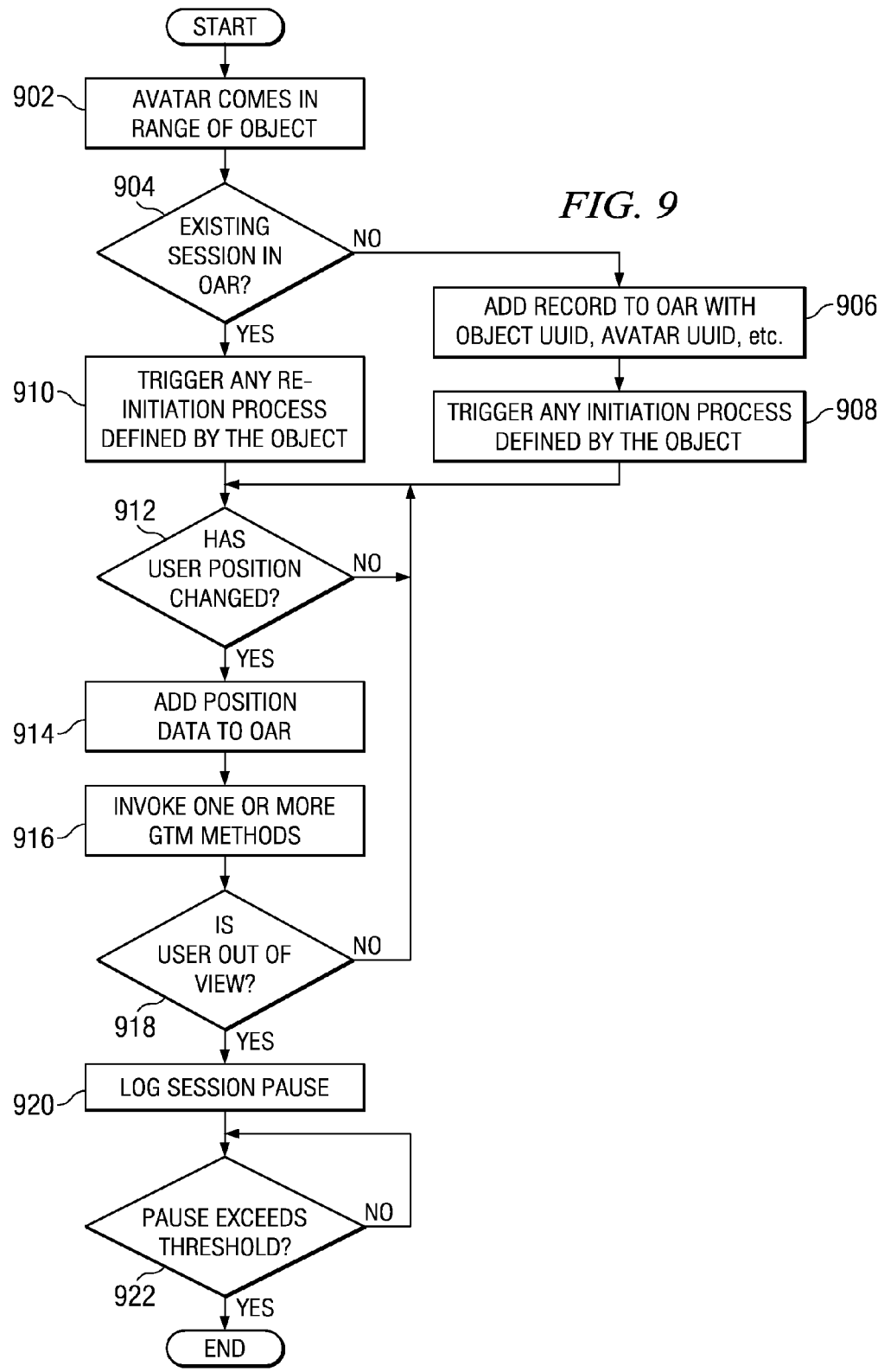
FIG. 9 is a flowchart illustrating a process for object based avatar tracking using object avatar rendering tables in accordance with an illustrative embodiment.

FIG. 9 is a flowchart illustrating a process for object based avatar tracking using object avatar rendering tables in accordance with an illustrative embodiment. The process in FIG. 9 is implemented by software for tracking avatars in a range of an object, such as object based avatar tracking controller 306 in FIG. 3.

The process begins when an avatar comes in range of the object (step 902). A determination is made as to whether there is an existing session associated with the unique identifier of the object and the unique identifier of the avatar (step 904). This step may be implemented by making a query to the object avatar rendering table for the object. If there is not an existing session, the process creates a record in the object avatar rendering table with the unique identifier of the object and the unique identifier of the avatar (step 906). The record in the object avatar rendering table may include other information, such as, without limitation, a date and time, which can be used for analysis, reporting, and billing purposes.

The process triggers any object initiation process defined by the object (step 908). For example, if a user is viewing the object for the first time and the object has a video associated with viewing the object, the process starts playing the video from the beginning.

Returning to step 904, if a session already exists, the process triggers any object re-initiation process defined by the object (step 910). For example, if the user is not viewing an object with an associated video for the first time, the process starts playing the video at a point in the video after the beginning, such as after an introduction, in a middle part, or near the end of the video to avoid replaying introductory material.

The process makes a determination as to whether the user's position has changed (step 912). Changing position may include traveling, turning, or disappearing, such as teleporting, logging off, or disconnecting. If the user's position has not changed, the process returns to step 912. The process may return to step 912 if the user's position does not change within a specified amount of time. The specified amount of time may be configured by the virtual universe grid administrator or object owner. The specified amount of time may occur very frequently, such as, without limitation, after a specified number of seconds or after a specified number of milliseconds.

When the user's position changes at step 912, the process adds the user position data to the object avatar rendering table (step 914). The user position data includes angle of view coordinate data of the avatar relative to the object and distance of the avatar to the object. The process then performs an analysis of the position data and modifies the object according to one or more geometric and texture modification methods (GTMs) (step 916) to improve visibility of the object.

The process then makes a determination as to whether the user is out of view (step 918). The user may be out of view if the user or the user's avatar has disappeared or is no longer facing the object. If the user is not out of view, after a specified amount of time the process returns to step 912. The specified amount of time may be configured by the virtual universe grid administrator or object owner. The specified amount of time may be, without limitation, a specified number of seconds or a specified number of milliseconds.

If the user is out of view at step 918, the process logs a session pause (step 920). The log may include the date and time. Next, the process makes a determination as to whether the session has been paused for an amount of time that exceeds a threshold amount of time (step 922). The threshold amount of time may be configured by a virtual universe administrator or object owner. If the pause does not exceed the threshold, the process returns to step 922. When the pause exceeds the threshold, the process terminates thereafter.

The process termination may include, without limitation, removing the records of the avatar from the object avatar rendering table. If the record is not deleted, when the avatar comes back into range of the object at step 902, the process will make a determination at step 904 that an existing session associated with the unique identifier of the object and a unique identifier of the avatar already exist.

Thus, the illustrative embodiments provide a computer implemented method, apparatus, and computer program product for object based avatar tracking. In one embodiment, a range for an object in a virtual universe is identified. The range comprises a viewable field of the object. Avatars in the viewable field of the object are capable of viewing the object. Avatars outside the viewable field of the object are incapable of viewing the object. In response to an avatar coming within the range of the object, an object avatar rendering table is queried for a session associated with the avatar unique identifier and the object unique identifier. The object avatar rendering table comprises a unique identifier of a set of selected objects and unique identifiers for each avatar in a range of a selected object in the set of selected objects. An object initiation process associated with the object is triggered.

The object based avatar tracking determines viewable areas for an avatar within the vicinity of a designated object. Rather than analyzing data sent to each virtual universe client, as in the prior art, the object based avatar tracking treats an object as if it were a virtual client. In other words, the object is given a viewable field and treated as if the object were an avatar with eyes capable of viewing avatars in the viewable field. This not only reduces the amount of data processing as compared to prior art method for managing objects, but this method also allows for more complex and dynamic rendering of objects. For example, the object tracking is used to dynamically alter the position and appearance of objects within a virtual universe to enable maximum visibility of the designated object.

Thus, the object based avatar tracking makes it possible to increase the visibility of objects for the maximum number of users, in terms of overall time seen and quality of viewing. The object based avatar tracking also increases the value of objects within a virtual universe because the visibility of these objects is improved.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable data storage medium providing program code for use by or in connection with a computer or any instruction execution system. For the purposes of this description, a computer-usable or computer readable data storage medium can be any tangible apparatus that can store the program for use by or in connection with the instruction execution system, apparatus, or device.

The data storage medium can be an electronic, magnetic, optical, or semiconductor system (or apparatus or device). Examples of a computer-readable data storage medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for object based avatar tracking, the method comprising the steps of:
a computer identifying a range for an object in a virtual universe, wherein the range comprises a viewable field of the object, wherein avatars in the viewable field of the object are capable of viewing the object, and wherein avatars outside the viewable field of the object are incapable of viewing the object;
responsive to an avatar coming within the range of the object, the computer querying an object avatar rendering table for a session associated with an avatar unique identifier and an object unique identifier, wherein the object avatar rendering table comprises a set of object unique identifiers for a set of selected objects, and an avatar unique identifier for each avatar within a range of a selected object in the set of selected objects;
the computer triggering an object initiation process associated with the object; and
responsive to a determination that the object is adjacent to an obstructing object, the computer setting a focal point of the viewable field at a location that is a different location than a location of the object.

2. The method of claim 1 further comprising the step of:
responsive to an absence of the session for the avatar unique identifier and the object unique identifier in the object avatar rendering table, the computer creating a record in the object avatar rendering table for the object and the avatar, wherein the record comprises the object unique identifier of the object, the avatar unique identifier of the avatar, and a time stamp indicating a time when the avatar entered the range of the object.

3. The method of claim 2 further comprising the step of:
responsive to the computer creating the record in the object avatar rendering table for the object and the avatar, the computer identifying the avatar as a first time viewer of the object and displaying content associated with the object that is first time viewing content.

4. The method of claim 1 further comprising the step of:
responsive to the computer identifying the session associated with the object unique identifier and the avatar unique identifier in the object avatar rendering table, the computer identifying the avatar as a repeat viewer of the object and triggering an object re-initiation process identified by the object, wherein the object re-initiation process displays repeat viewer content associated with the object, wherein the repeat viewer content is content associated with a repeat viewing of the object, and wherein the repeat viewer content is different than a first time viewing content.

5. The method of claim 1 wherein the object initiation process
retrieves content associated with the object for display to a user when the avatar comes within the viewable field of the object, wherein the content is stored in a cache until the content is displayed to the user.

6. The method of claim 1 wherein the range further comprises:
a detection area, wherein the detection area is located outside the viewable field of the object, and wherein avatars within the detection area are incapable of viewing the object.

7. The method of claim 1 further comprising the step of:
the computer adding data describing the avatar to the object avatar rendering table, wherein the data comprises:
a zone one enter time indicating a date and time when each avatar in the range of the object entered the viewable field; a zone one leave time indicating a date and time when each avatar in the range left the viewable field; a number of zone one enters indicating how many times each avatar in the range entered the first zone; and last coordinates indicating coordinate data identifying a location of each avatar in the range of the object.

8. The method of claim 1 further comprising the step of:
the computer adding data describing the avatar to the object avatar rendering table, wherein the data comprises:
a zone two enter time indicating a date and time when each avatar in the range of the object entered a detection area outside the viewable field; a zone two leave time indicating a date and time when each avatar in the range left the detection area; and a number of zone two enters indicating how many time each avatar in the range entered the detection area.

9. A computer program product comprising:
one or more computer-readable tangible storage devices;
program instructions, stored on at least one of the one or more storage devices, to identify a range for an object in a virtual universe, wherein the range comprises a viewable field of the object, wherein avatars within the viewable field of the object are capable of viewing the object, and wherein avatars outside the viewable field of the object are incapable of viewing the object;
program instructions, stored on at least one of the one or more storage devices, to query an object avatar rendering table for a session associated with an avatar unique identifier and an object unique identifier in response to an avatar coming within the range of the object, wherein the object avatar rendering table comprises a set of object unique identifiers for a set of selected objects and an avatar unique identifier for each avatar within a range of a selected object in the set of selected objects;
program instructions, stored on at least one of the one or more storage devices, to trigger an object initiation process associated with the object; and
program instructions, stored on at least one of the one or more storage devices, to, responsive to a determination that the object is adjacent to an obstructing object, set a focal point of the viewable field at a location that is a different location than a location of the object.

10. The computer program product of claim 9 further comprising:
program instructions, stored on at least one of the one or more storage devices, to create a record in the object avatar rendering table for the object and the avatar in response to an absence of the session for the avatar unique identifier and the object unique identifier in the object avatar rendering table, wherein the record comprises the object unique identifier of the object, the avatar unique identifier of the avatar, and a time stamp indicating a time when the avatar entered the range of the object.

11. The computer program product of claim 10 further comprising:
program instructions, stored on at least one of the one or more storage devices, to identify the avatar as a first time viewer of the object and to display content associated with the object that is first time viewing content in response to creating the record in the object avatar rendering table.

12. The computer program product of claim 9 further comprising:
program instructions, stored on at least one of the one or more storage devices, to, responsive to identifying the session associated with the object unique identifier and the avatar unique identifier in the object avatar rendering table, identify the avatar as a repeat viewer of the object and trigger an object re-initiation process identified by the object, wherein the object re-initiation process displays repeat viewer content associated with the object, wherein the repeat viewer content is associated with a repeat viewing of the object, and wherein the repeat viewer content is different than a first time viewing content.

13. The computer program product of claim 9 wherein the object initiation process
retrieves content associated with the object for display to a user when the avatar comes within the viewable field of the object, wherein the content is stored in a cache until the content is displayed to the user.

14. The computer program product of claim 9 wherein the range further comprises:
a detection area, wherein the detection area is located outside the viewable field of the object, and wherein avatars within the detection area are incapable of viewing the object.

15. The computer program product of claim 9 further comprising:
program instructions, stored on at least one of the one or more storage devices, to add data describing the avatar to the object avatar rendering table, wherein the data comprises: a zone one enter time indicating a date and time when each avatar in the range of the object entered the viewable field; a zone one leave time indicating a date and time when each avatar in the range left the viewable field; a number of zone one enters indicating how many times each avatar in the range entered the first zone; and last coordinates indicating coordinate data identifying a location of each avatar in the range of the object.

16. The computer program product of claim 9 further comprising:
program instructions, stored on at least one of the one or more storage devices, to add data describing the avatar to the object avatar rendering table, wherein the data comprises: a zone two enter time indicating a date and time when each avatar in the range of the object entered a detection area outside the viewable field; a zone two leave time indicating a date and time when each avatar in the range left the detection area; and a number of zone two enters indicating how many time each avatar in the range entered the detection area.

17. A virtual universe grid computing system for object based avatar tracking, the system comprising:
one or more processors, one or more computer-readable memories and one or more computer-readable tangible storage devices;
program instructions, stored on at least one of the one or more storage devices for execution by at least one of the one or more processors via at least one of the one or more memories, to identify a range for an object in a virtual universe, wherein the range comprises a viewable field of the object, wherein avatars within the viewable field of the object are capable of viewing the object, and wherein avatars outside the viewable field of the object are incapable of viewing the object;
program instructions, stored on at least one of the one or more storage devices for execution by at least one of the one or more processors via at least one of the one or more memories, to generate an object avatar rendering table, wherein the object avatar rendering table comprises a set of object unique identifiers for a set of selected objects, and an avatar unique identifier for each avatar in a range of a selected object in the set of selected objects;
program instructions, stored on at least one of the one or more storage devices for execution by at least one of the one or more processors via at least one of the one or more memories, to detect an avatar coming within the range of the object;
program instructions, stored on at least one of the one or more storage devices for execution by at least one of the one or more processors via at least one of the one or more memories, to query the object avatar rendering table for a session associated with an avatar unique identifier for the avatar coming within range of the object and an object unique identifier for the object;
program instructions, stored on at least one of the one or more storage devices for execution by at least one of the one or more processors via at least one of the one or more memories, to trigger an object initiation process for the object; and
program instructions, stored on at least one of the one or more storage devices for execution by at least one of the one or more processors via at least one of the one or more memories, to, responsive to a determination that the object is adjacent to an obstructing object, set a focal point of the viewable field at a location that is a different location than a location of the object.

18. The system of claim 17, further comprising:
program instructions, stored on at least one of the one or more storage devices for execution by at least one of the one or more processors via at least one of the one or more memories, to add data describing the avatar to the object avatar rendering table, wherein the data comprises: a zone one enter time indicating a date and time when each avatar in the range of the object entered the viewable field; a zone one leave time indicating a date and time when the each avatar in the range of the selected object left the viewable field; a number of zone one enters indicating how many times the each avatar in the range entered the first zone; and last coordinates indicating coordinate data identifying a location of the each avatar in the range of the object.

* * * * *